(12) United States Patent
Leonard et al.

(10) Patent No.: US 12,210,743 B2
(45) Date of Patent: Jan. 28, 2025

(54) ACCESSIBLE VIRTUAL TOUR SYSTEM AND METHOD

(71) Applicant: AVT LLC, Venice, CA (US)

(72) Inventors: Gregory Allen Leonard, Venice, CA (US); Barry Alexander Ross, Cummings, GA (US); Astrid Justine Reed, Venice, CA (US)

(73) Assignee: AVT LLC, Wilmington, DE (US)

( * ) Notice: Subject to any disclaimer, the term of this patent is extended or adjusted under 35 U.S.C. 154(b) by 0 days.

(21) Appl. No.: 18/093,707

(22) Filed: Jan. 5, 2023

(65) Prior Publication Data

US 2023/0251778 A1    Aug. 10, 2023

Related U.S. Application Data

(60) Provisional application No. 63/296,525, filed on Jan. 5, 2022.

(51) Int. Cl.
*G06F 3/048* (2013.01)
*G06F 3/01* (2006.01)
*G06F 3/0482* (2013.01)
*G06F 3/0489* (2022.01)

(52) U.S. Cl.
CPC ............ *G06F 3/0489* (2013.01); *G06F 3/011* (2013.01); *G06F 3/0482* (2013.01)

(58) Field of Classification Search
CPC . G06F 8/20; G06F 3/0489; G06F 3/01; G06F 3/0482; G06F 3/011
See application file for complete search history.

(56) References Cited

U.S. PATENT DOCUMENTS

2020/0334411 A1* 10/2020 Patel ..................... G06F 40/143
2022/0121723 A1*  4/2022 Page .................... G06F 11/0784
2023/0022493 A1*  1/2023 Madhugiri ............ G06F 16/986

* cited by examiner

*Primary Examiner* — Michael A Faragalla
(74) *Attorney, Agent, or Firm* — Thomas P. Heed; Heed Law Group PLLC

(57) ABSTRACT

A novel system and method for navigating virtual tours using Web Content Accessibility Guidelines (WCAG). The system and method allows a user to select a virtual tour from a plurality of virtual tour providers. The system and method presents the user with content related to POI from a plurality of media content providers. The system and method can overlay a virtual tour with WCAG-compliant buttons and graphics. The system and method disable the navigation and points of interest contents from the native virtual tours and presents WCAG-compliant navigation hot keys and points of interest.

14 Claims, 16 Drawing Sheets

ACCESSIBLE VIRTUAL TOUR SYSTEM AND METHOD

FIELD OF INVENTION

The present invention relates to the classification for image data processing or generation; and to one or more sub-classifications for manipulating 3D models or images for computer graphics. Specifically, the present invention allows for accessible virtual tours using a computer keyboard and Web Content Accessibility Guidelines (WCAG).

CLAIM OF PRIORITY

This is a non-provisional application claiming priority to provisional patent application 63/296,525 filed Jan. 5, 2022

BACKGROUND OF INVENTION

Roughly 26% of the world's population has a disability. A key component of digital accessibility for many people from the disability community is the ability to use the computer's keyboard and/or a device's accessibility features to navigate through a web-based interface and access functions within. This is addressed in the Web Content Accessibility Guidelines (WCAG), now in version 2.1, which are the internationally recognized standards for digital accessibility. Digital Accessibility is a crucial practice that enables people with disabilities to fully participate in an increasingly digital society.

An expanding segment of that digital society is the use of virtual tour experiences. A 360° virtual tour is a collection of panoramic rotating images, "stitched" together to form a full, 360° view of a location. Special cameras, lenses, technology, and methods are used to bring a tour together into a visual experience for the viewer. Often hosted on web pages, these tours are being used throughout the world for a wide range of purposes and are offered by a growing array of companies.

Areas such as retail, education, cultural institutions and real estate have seen widespread adoption of the use of virtual tours and these digital assets have become woven into many facets of human interaction and education. Barriers to digital accessibility have not been addressed in the design of virtual tour platforms.

While out-of-the box applications offer many users the ability to utilize these tours, many people, particularly those relying on keyboard navigation, screen readers, and other assistive technologies are unable to have an experience comparable to a user not requiring assistive technology. Thus, many people from the disability community have been excluded from being able to access these digital tools and as a consequence have not been able to participate in this growing segment of public life.

SUMMARY OF THE INVENTION

This summary is intended to disclose the present invention, an accessible virtual tour system and method that allows for keyboard navigation using WCAG. The embodiments and descriptions are used to illustrate the invention and its utility and are not intended to limit the invention or its use. The following presents a simplified summary of the primary embodiment of the invention to provide a basic understanding of the invention. Additional concepts that can be added or varied with the primary embodiment are also disclosed. The present invention is novel with respect to the prior art, and can be distinguished from the prior art.

The Accessible Virtual Tour (AVT) is a method that makes virtual tours digitally accessible using the WCAG protocol. A tour is a media presentation that allows a viewer to navigate through a physical space, such as a real estate tour that allows a viewer to virtually tour a house.

The present method embeds a tour in an iframe, and disables the native functionality which is not conducive to an accessible experience. The method then fetches data relating to the tour, generates an overlay in which it renders digitally accessible components such as a menu containing "points of interest" locations, a menu containing links to predefined scenes, a modal displaying content specific to a selected point of interest such as text, images and videos, as well as buttons and toggle switches. These components are populated with data that has been fetched by the tour and some have the capability to react to where the user is in the tour. For example, the method allows users the option for the points of interest menu items to be filtered and re-ordered based on the camera position as it changes during the user's experience. The display of all the aforementioned components revolves around the fetched data from the tour as well as the current state of the tour based on user's selections. For example, a given menu may not be displayed if no relevant tour information has been gathered and all components can be presented with an increased contrast ratio if the user has enabled the optional high-contrast mode. The method also adds event listeners which respond to custom hot keys offering users easy ways to "look", "walk" and jump between scenes. Collectively, the above enhancements to the native tour offers users a WCAG 2.1 compliant navigational experience of an otherwise lacking digitally accessible experience.

BRIEF DESCRIPTION OF THE DRAWINGS

The present invention is illustrated with 16 drawings on 16 sheets.

DESCRIPTION OF THE DRAWINGS

The following descriptions are not meant to limit the invention, but rather to add to the provisional summary of invention, and illustrate the present invention, an accessible virtual tour system and method that allows for keyboard navigation using WCAG. The present invention is illustrated with a variety of drawings showing the primary embodiment of the present invention, with examples presented showing various stages of an accessible virtual tour.

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left are used to describe the accompanying figures. The terminology includes the words above specifically mentioned, derivatives thereof, and words of similar import.

Figure 1:
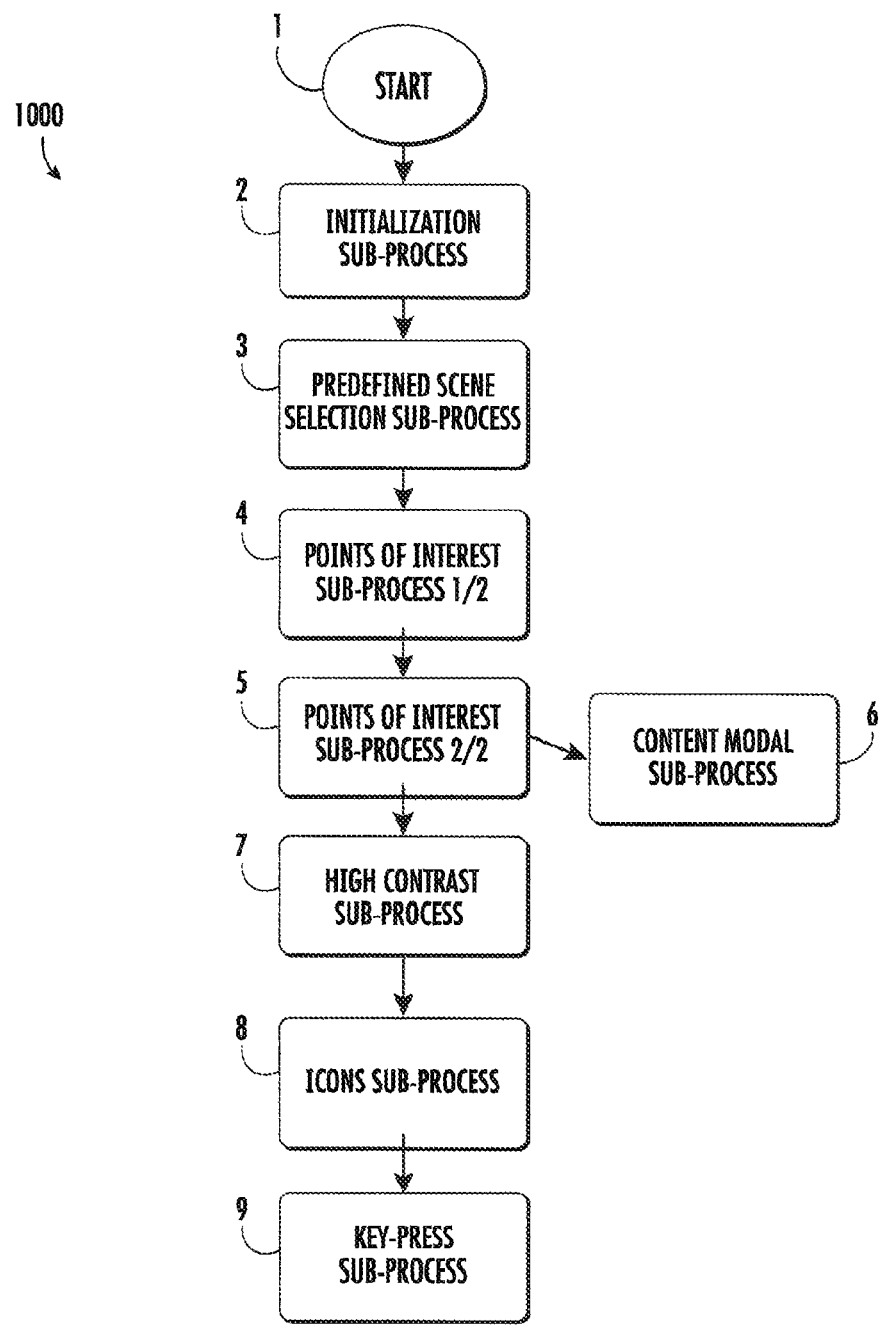
FIG. 1 is a flow chart of the overall method.
Figure 10:
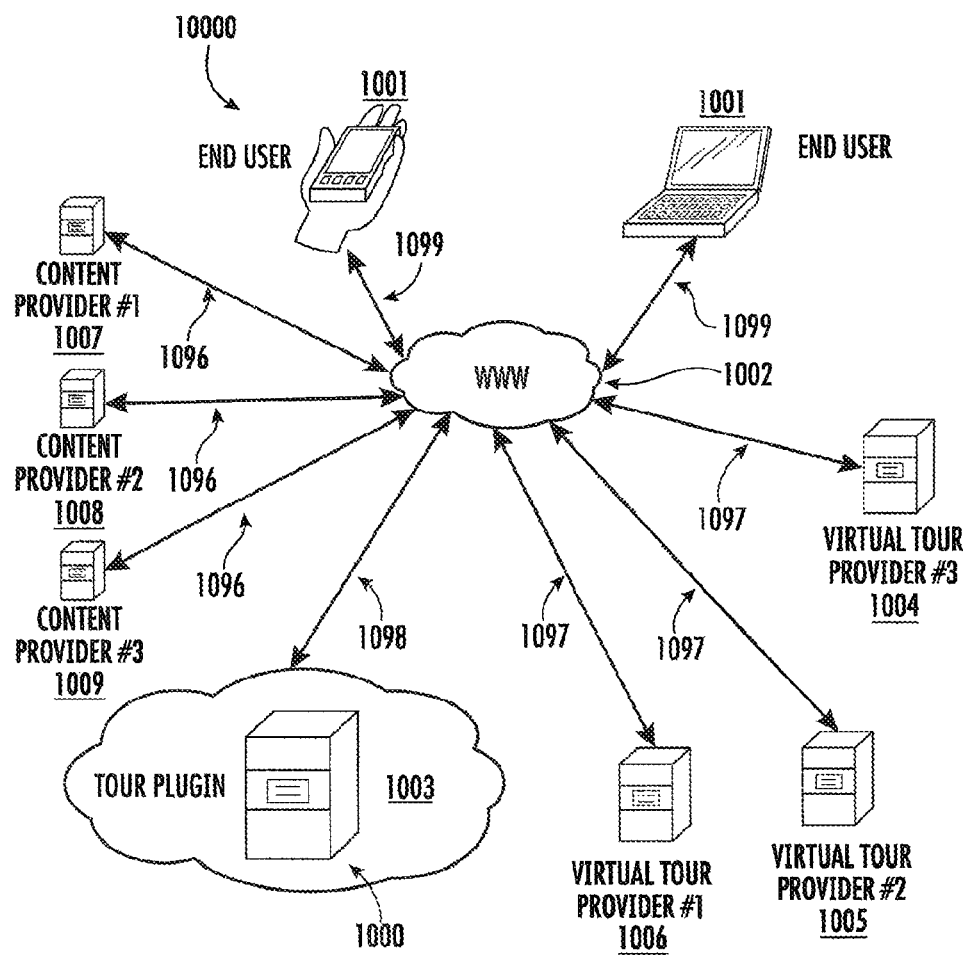
FIG. 10 is a network diagram.

FIG. 1 is the high-level flow chart of the AVT method 1000. FIG. 10 is diagram of the AVT system 10000. A user interfaces with the AVT system 10000 by using an end-user electronic device 1001 such as a computer, laptop, tablet, or cellphone 1001, containing a non-transitory memory element and at least one processor capable of executing an instruction set stored on the non-transitory memory element. The end-user electronic device 1001 will typically possess keyboard functionality in order to facilitate WCAG-compliant navigation, although other means exist for WCAG-compliant navigation, such as device-specific accessibility features. An end-user electronic device 1001 accesses 1098, 1099 the AVT server 1003 through the world wide web 1002. The AVT server 1003 allows the end-user electronic device 1001 to download the AVT Method 1000, which is stored in a non-transitory memory element on an AVT server 1003. The AVT Method 1000 is a computer-readable instruction set.

Figure 11:
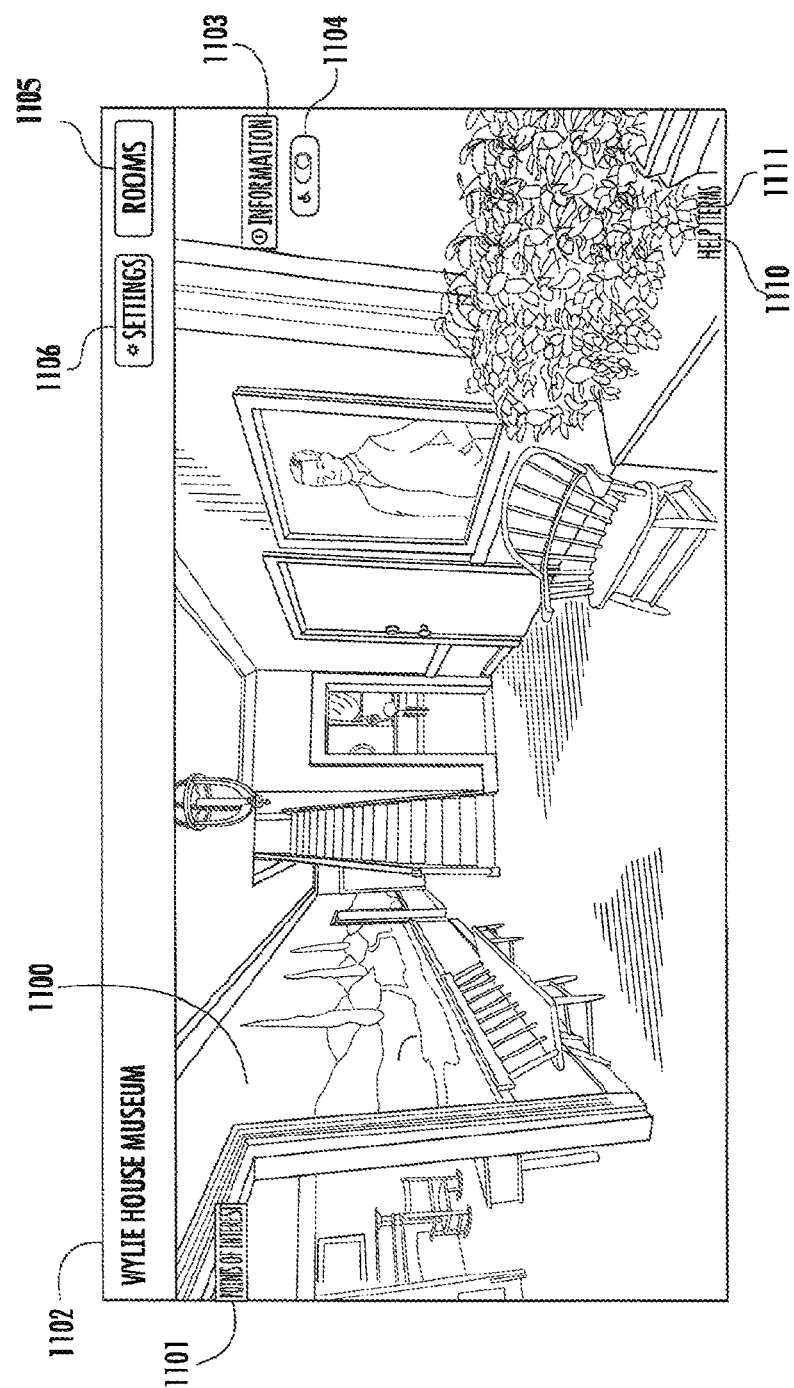
FIG. 11 is an initial-state screenshot of an Accessible Virtual Tour example.

The end-user electronic device 1001 is then capable of running the AVT Method 1000 by accessing the non-transitory memory element on which it is stored within the end-user electronic device 1001 and executing it using one or more processors resident in the end-user electronic device 1001. There are a plurality of communication channels 1096, 1097, 1098, 1099 such as wifi, internet, cellular, and satellite. The communications channels 1096, 1097, 1098, 1099 are accessed using commercially available network access devices such as wifi chipsets, cellular chipsets, and satellite chipsets. The end-user electronic device 1001 can then access 1099, 1097 the servers of multiple virtual tour providers 1004, 1005, 1006 using the world wide web 1002, allowing the AVT method 1000 to interact with the servers of the virtual tour providers 1004, 1005, 1006. Likewise, the end-user electronic device 1001 can access 1099, 1096 the servers of multiple media content providers 1007, 1008, 1009 using the world wide web 1002, allowing the AVT method 1000 to interact with the servers of multiple content providers 1007, 1008, 1009. For example, an end-user electronic device 1001 uses the web 1002 to select a virtual tour 1004 using the AVT Method 1000. The virtual tour 1004 uses media from a content provider 1007. The AVT Method 1000 on the end-user electronic device 1001 interacts with a particular tour provider (e.g. 1004) and content provider (e.g., 1007) as it renders the tour 1100 (see e.g., FIG. 11), embedded in an iframe, fetches data, and performs interactions such as "looking" and "walking". FIG. 11 shows an example of a virtual tour 1100.

FIG. 1 is the high-level flow chart of the method. The tour 1100 is started 1. The AVT Method 1000 is initialized through an initialization sub-process 2. The AVT 1000 uses a pre-defined scene selection sub-process 3, followed by two sub-processes related to the handling of points of interest. 4, 5. The AVT 1000 runs a side sub-process for handling points of interest modals 6. A point of interest model sub-process 6 controls the display of one or more graphic elements that is displayed in front of and de-activate other content. The AVT 1000 runs a high-contrast sub-process 7, followed by an icon sub-process 8. Once all other sub-processes are functioning, the AVT 1000 runs the key-press sub-process 9, allowing for WCAG navigation of the tour 1100. Additional sub-processes may be added on, allowing WCAG-compliant navigation of a tour 1100 using other, device-specific accessibility features.

Figure 2:
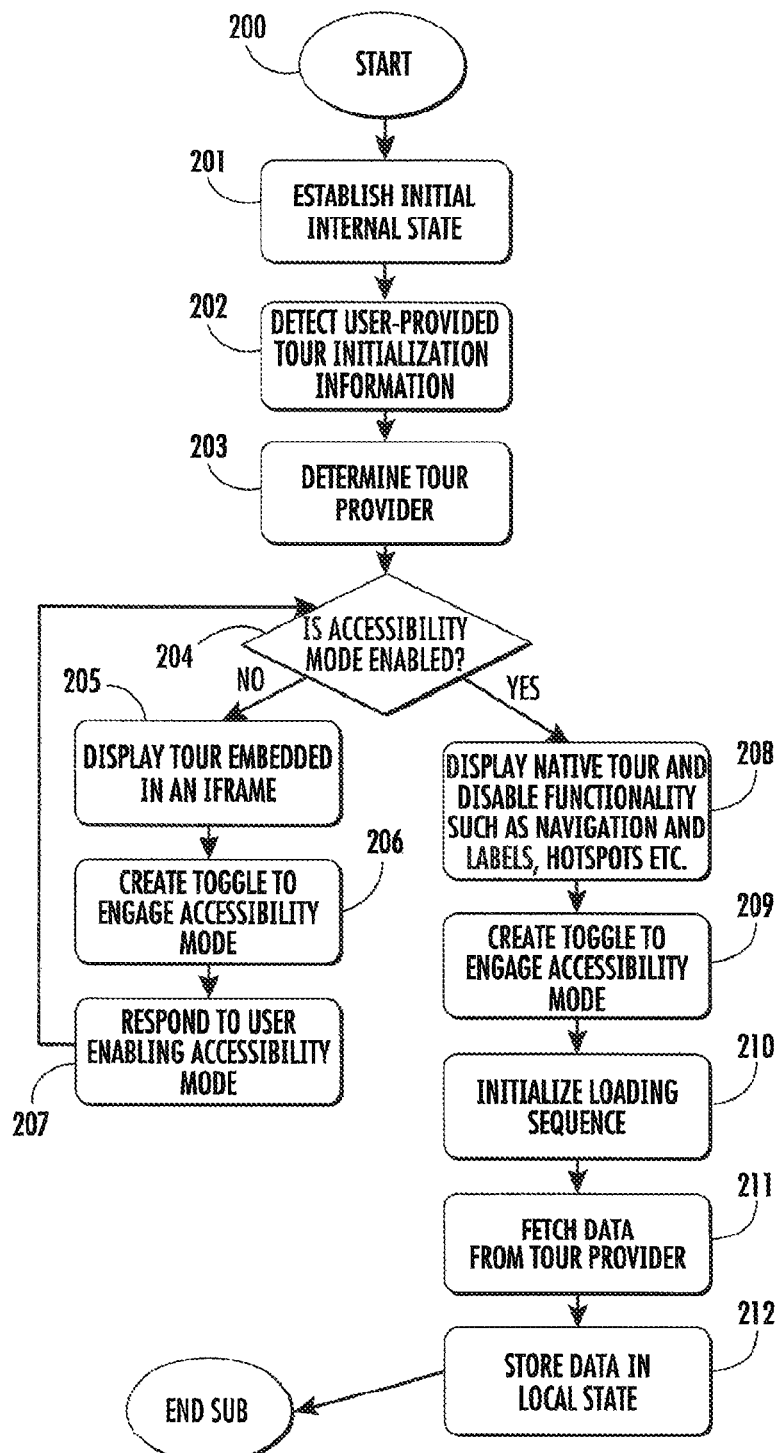
FIG. 2 is a flow chart of an initialization sub-process method.

FIG. 2 shows the initialization sub-process 2. The sub-process 2 starts 200 and the AVT Method 1000 initializes its internal state 201 and creates a schema for future data organization and storage as well as default settings. Future data is at least one of
  a) basic tour info (e.g. name, model id),
  b) information about camera position,
  c) information about points of interest including, but not limited to
    i) name,
    ii) location in tour,
    iii) content,
    iv) metadata,
  d) information about predefined scene selections.

Default settings are at least one of a) info box, b) info content, c) info title, d) sidebar, e) menu, t) accessibility, g) keyboard mode, h) contrast, i) current view, j) current position, k) positional data, l) icons, m) labels, n) tags, o) tags object, p) active point of interest, q) tour data, r) model details, and s) radius.

The AVT method 1000 detects user-provided information 202 and stores it in-memory. Based on this information, the AVT method 1000 determines which tour provider 1004, 1005, 1006 to interface 203 with and checks whether accessibility mode is enabled 204.

Figure 12:
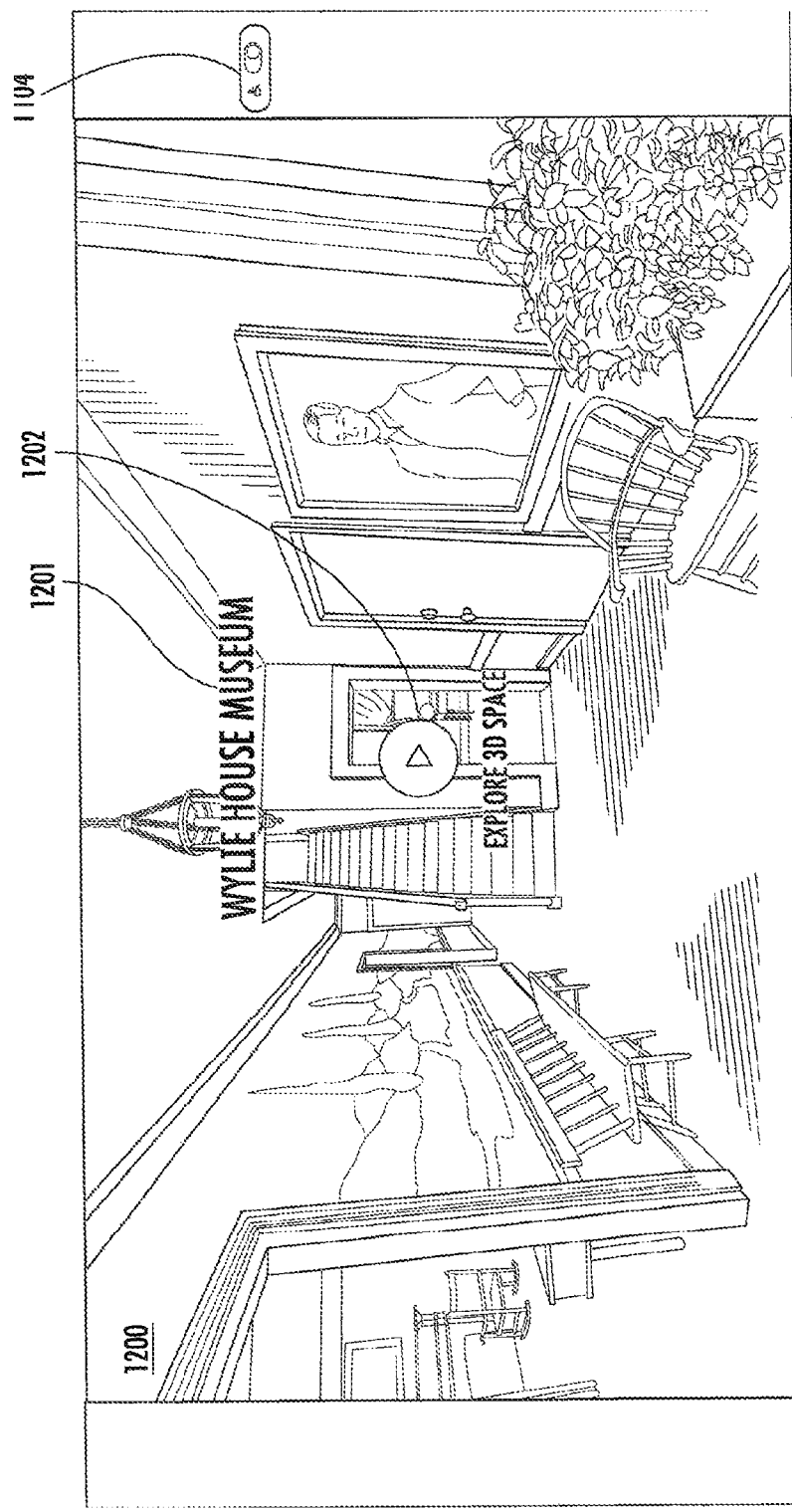
FIG. 12 is a further screenshot of an Accessible Virtual Tour, with the accessibility mode turned off.

If accessibility mode is not enabled, the AVT method 1000 displays the unaltered tour embedded in an iframe 205. Referring to FIG. 12, the AVT Method 1000 renders an accessibility mode toggle 1104 as an overlay on the unaltered tour 1200. The unaltered tour 1200 is embedded in an iframe 205, because the accessibility mode toggle 1104 is not enabled. An option to toggle accessibility mode toggle 1104 on/off 206 is visible on the screen. With the accessibility mode off 1104, the unaltered tour 1200 provides unaltered embedded tour navigation 1202 and a title 1201. The AVT Method responds to accessibility mode toggle 1104 selection by enabling accessibility mode 207.

If accessibility mode is enabled, by the toggle switch 1104 or user provided information the native tour is displayed embedded in an iframe with customizations 208. FIG. 11 shows a tour 1100 embedded in an iframe with customization. Its native functionality such as navigation, clickable hotspots, labels etc. are disabled and/or removed. An option to toggle accessibility mode on/off 209 is rendered on the screen 1104. A banner title 1102 is rendered and enabled. A point of interest 1101 button is rendered and enabled. A settings button 1106 and a rooms button 1105 are rendered and enabled. An information button 1103 is rendered and enabled. A link to help 1110 and a link to terms and conditions 1111 are rendered and enabled.

Referring back to FIG. 2, at this point a loading sequence 210 takes place. Data from the tour provider is obtained 211 including
 a) basic tour info (name, model id),
 b) positional camera information,
 c) information about points of interest including, but not limited to i) name
  ii) location in tour
  iii) content
  iv) metadata
 d) information about predefined scene selections The data 211 is organized and stored 212 within the AVT Method 1000 in a local store. The Sub-Process ends.

Figure 3:
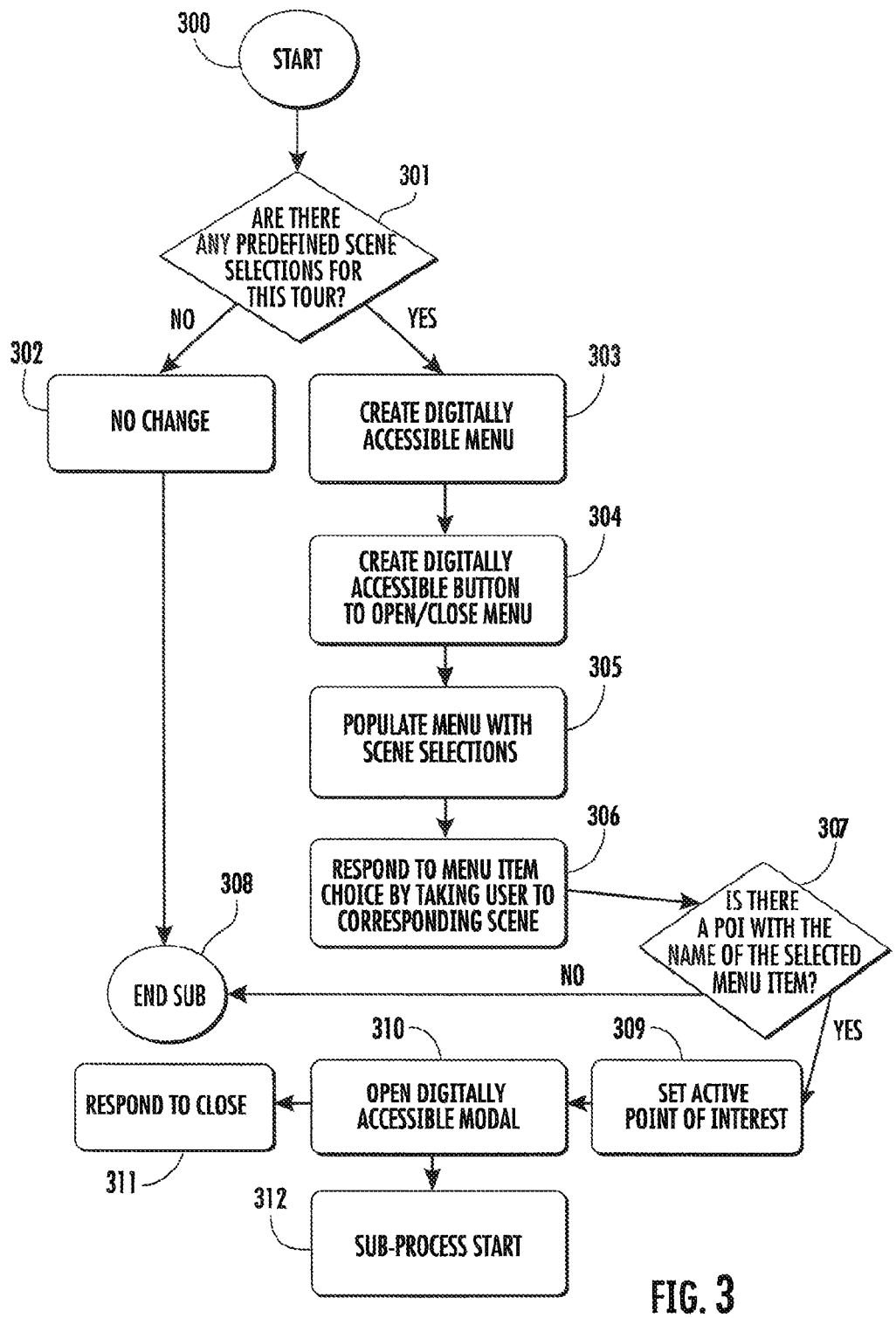
FIG. 3 is a flow chart of predefined scene selection sub-process method.
Figure 13:
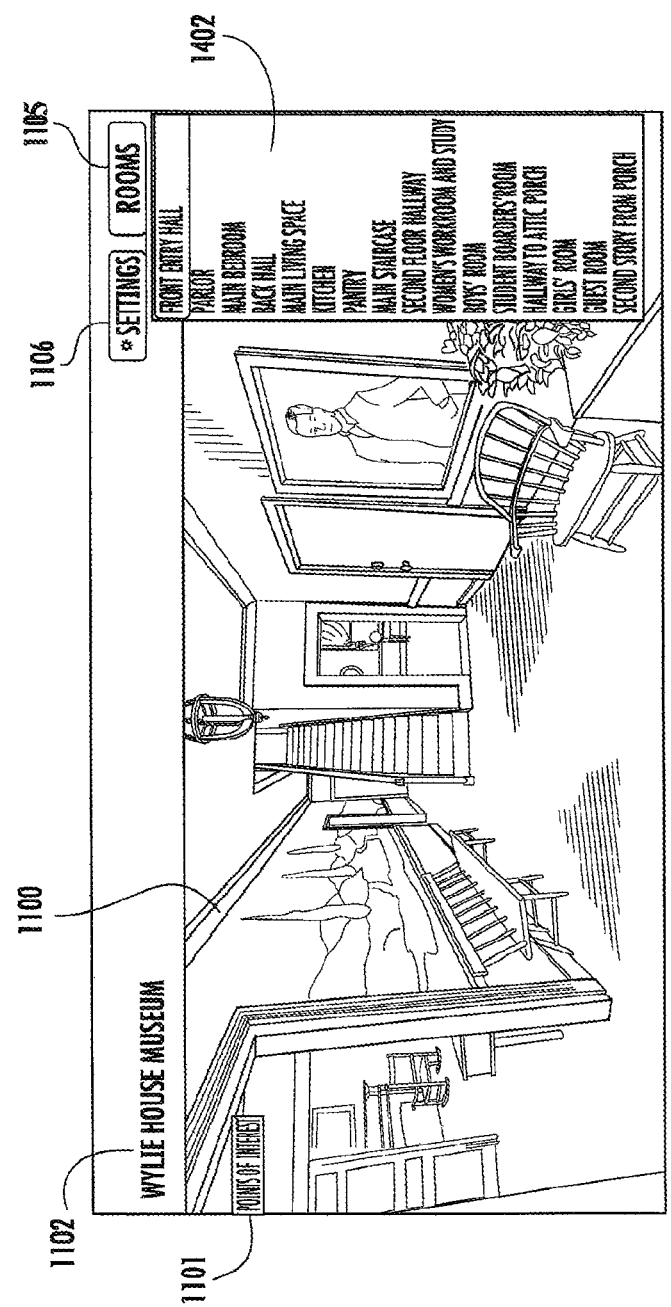
FIG. 13 is a further screenshot of an Accessible Virtual Tour, showing a rooms menu displayed by activating the rooms button.

FIG. 3 shows the pre-defined scene sub-process 3. At this point, the AVT Method 1000 begins rendering and populating components. The AVT Method 1000 checks whether predefined scene selections have been obtained 301. If none have been, there is no change to the user-interface (ui) 302. If predefined scene selections have been obtained, a digitally accessible menu is rendered 303 along with a digitally accessible button to open/close the menu 304. FIG. 13 shows the rendering of the digitally accessible menu 1402. The menu 303, 1402 is then populated with the scene selections 305. When a user selects (clicks, taps, presses etc.) a scene from the menu, the AVT Method 1000 responds by displaying the corresponding scene 306, 1100. In FIG. 13, the Front Entry Hall is highlighted in the digitally accessible room menu 1402, and the scene is set to the Front Entry Hall 1100 of the Wylie House Museum 1102.

Referring back to FIG. 3, again, the sub-process 300 then determines whether there is a POI with the name of the selected menu item 307. If there is no POI with the name of the corresponding selected menu item 307, the sub-process ends 308. If there is a POI with the name of the selected menu item, it is set active as a point of interest 309. A digital modal 310 is opened, corresponding to the POI that is set active 309. A POI sub-process is then started 312. When the user commands the modal to close 311, the sub-process closes the modal.

Figure 4:
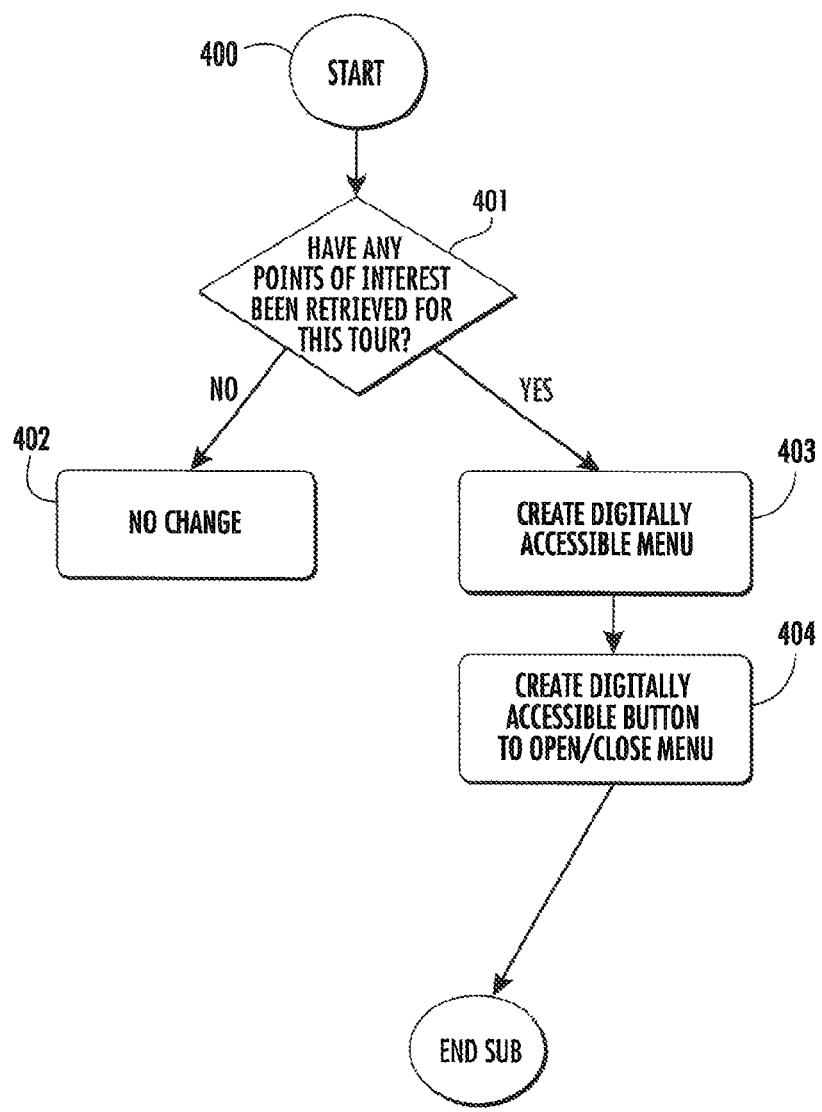
FIG. 4 is a flow chart of a sub-process method pertaining to points of interest.

FIG. 4 shows a first points of interest sub-process 4. The AVT Method 1000 performs a check to ascertain if any points of interest have been retrieved from the tour provider 401. If not, there is no change to the ui 402. If points of interest have been retrieved, a digitally accessible menu is generated 403, along with a digitally accessible button to open/close the menu 404.

Figure 14:
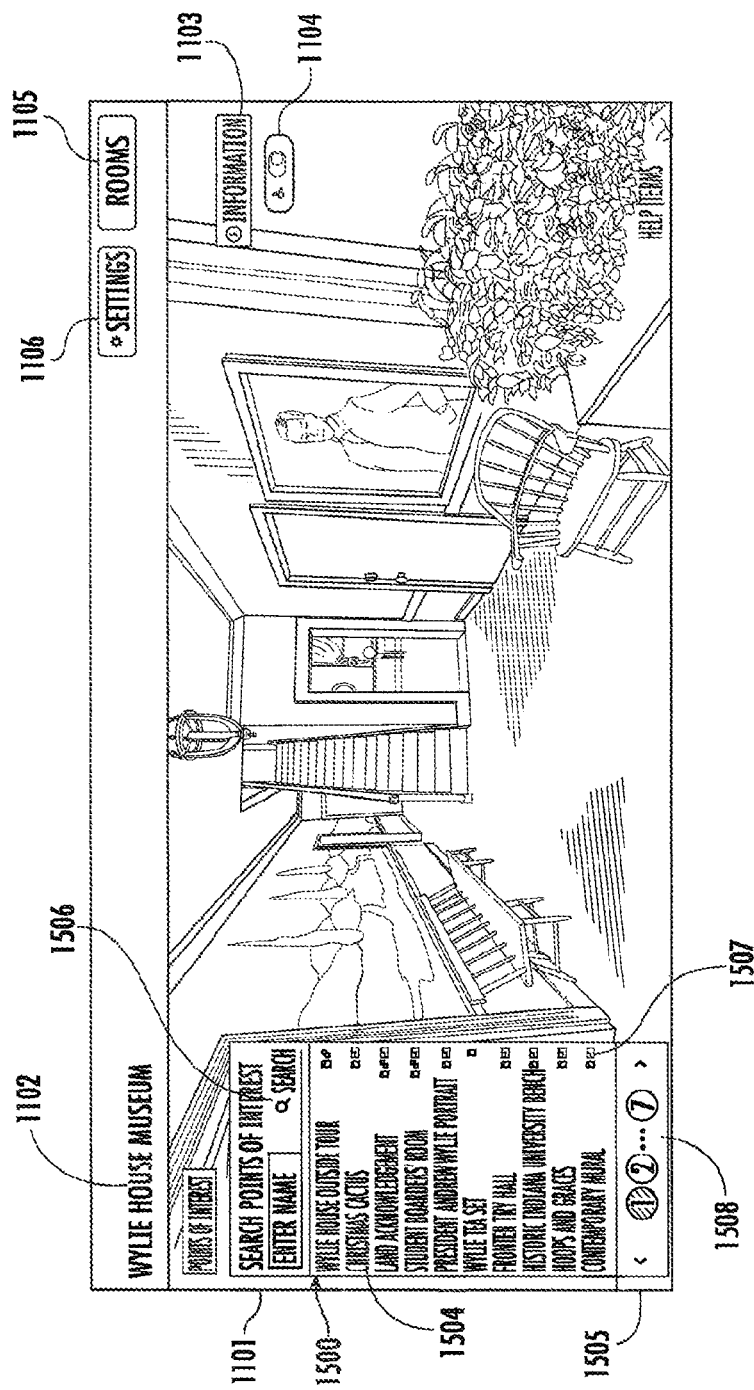
FIG. 14 is a further screenshot of an Accessible Virtual Tour with search points of interest menu open.

FIG. 14 shows a digitally accessible points of interest menu 1500 activated. The menu 1500 lists a plurality of points of interests 1504. Next to each of the plurality of points of interest 1504 are icons 1507 showing whether there is graphics, text, and/or media 1507. The menu 1500 has a search function 1506. At the bottom, there is a banner 1505 that has the menu page 1508 allowing the user to navigate to other menu pages 1508. This 1508 is the graphic implementation of the pagination system.

Figure 5:
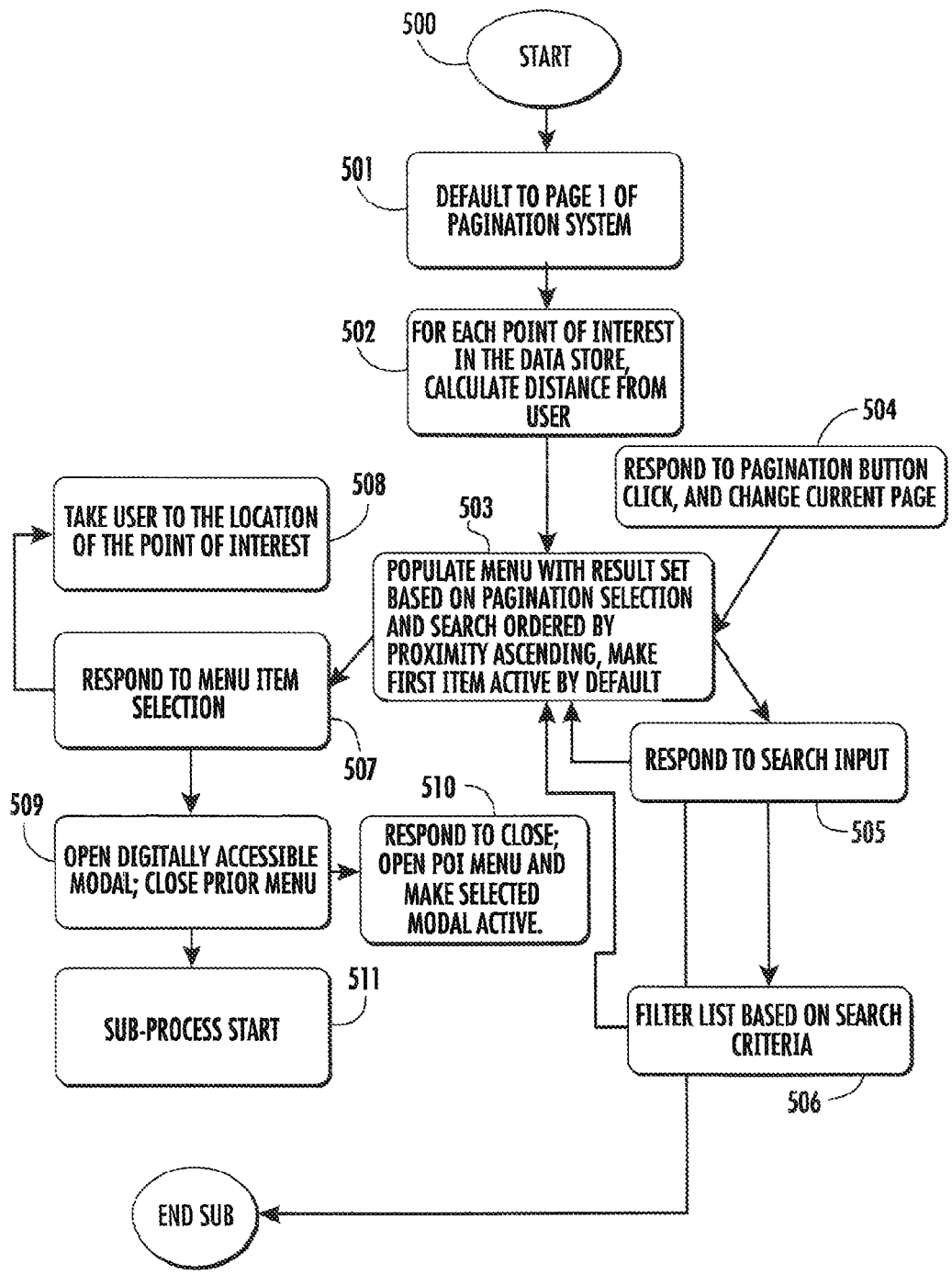
FIG. 5 is a flow chart of a further sub-process method pertaining to points of interest.

FIG. 5 shows a second points of interest sub-process 5. The AVT Method 1000 starts 500 this sub-process. The sub-process defaults to page 1 of the pagination system 501. The AVT Method 1000 calculates the distance that each point of interest is from the rendering representing the user 502. The AVT Method 1000 populates the menu 1500 with a result set based on pagination selection and search ordered by proximity ascending, making the first item active by default 503. If the user paginates using the graphic pagination system 1508, the AVT Method 1000 responds to pagination button click and changes the current page 504, repeating the process of 503.

Figure 15:
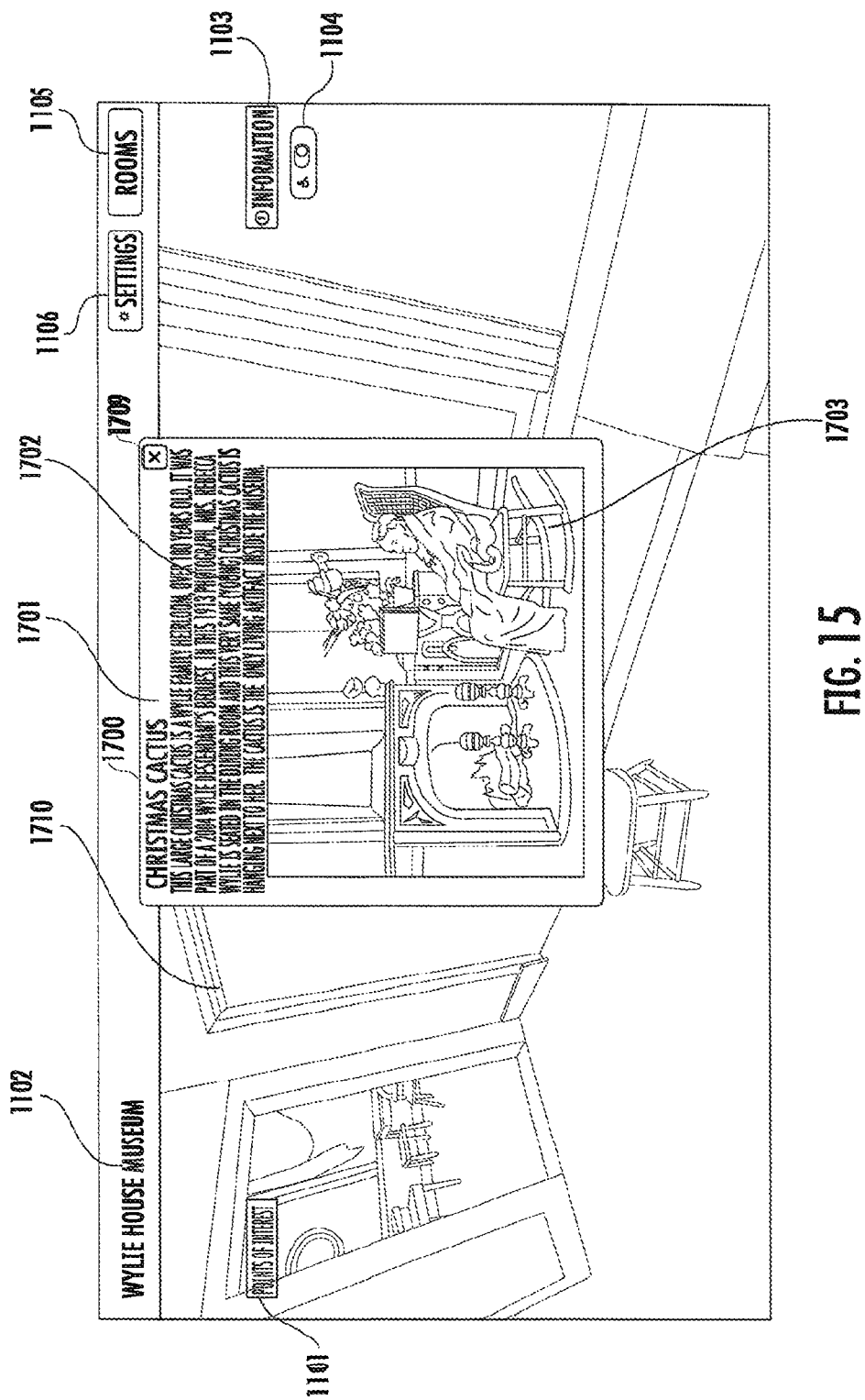
FIG. 15 is a further screenshot of an Accessible Virtual Tour with the point of interest modal showing.

The AVT Method 1000 responds to menu item selection 507 by taking user to the location of the point of interest 508 and opening a digitally accessible modal, closing the prior menu 509. This starts a modal sub-process 511. FIG. 15 shows the graphic representation of this. The scene is set to the location of the point of interest 1710, 508. The modal 1700 is opened and the prior menu is closed 509. The modal 1700 displays text 1702 and graphics 1703. The title 1701 is rendered. When the user hits the close button 1709, the modal 1700 closes.

Referring to FIG. 5 also, when the user closes 1709 the modal 1700, the AVT Method 1000 responds by opening the POI menu 1500 (see FIG. 14) and making the selected modal active 510. The AVT Method 1000 will respond to a user search input 505, 503 in the search box 1506 of the POI menu 1500. The user can filter the POI list 1500 based on the search criteria 506, 504.

Figure 6:
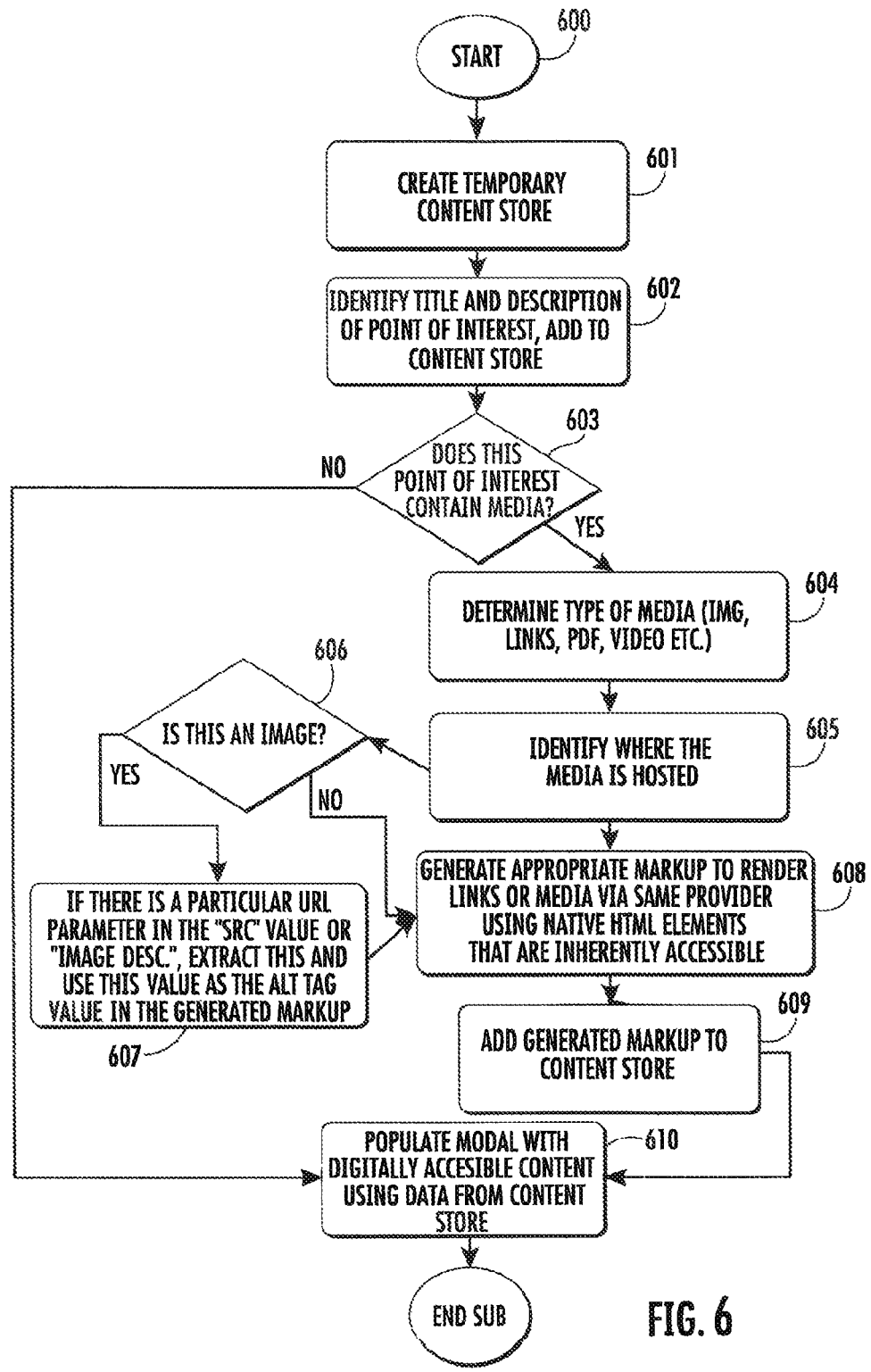
FIG. 6 is a flow chart of a sub-process method for presenting point of interest modal content.

FIG. 6 shows a content modal sub-process 6, related to the points of interest. The AVT Method 1000 creates a temporary in-memory content store 601, identifies and renders the title 1701 in the modal 508, 1700, and adds it to the content store 602. The AVT Method then analyzes the point of interest data and ascertains whether there is media included 603. If there is none 603-NO, the modal 1700 is populated with digitally accessible content using data from content store 610.

If there is an media 603—YES, such as text 1702, alt text, images 1703, or videos included in the point of interest data, the AVT Method 1000 determines the type (e.g. jpg, pdf, and mp4) 604 and the identities of the media content provider 605, 1007, 1008, 1009. The AVT Method 1000 then accesses the media 1702, 1703 directly from the server of the media content provider, 1007, 1008, 1009.

The AVT Method 1000 then determines if the media content is an image 606. If it is 606—YES, the AVT Method 1000 finds if there is an SRC value or image description and extracts this and uses this value as the alternative tag value in the generated mark-up 607. The AVT Method 1000 then generates an appropriate markup to render links or media via same provider using native HTML elements that are inherently accessible 608. The generated markup is then added to the content store 609 and the modal is populated 610.

If the AVT Method 1000 determines that the media content is not an image 606—NO, the AVT Method 1000 generates an appropriate markup to render links or media via same provider using native HTML elements that are inherently accessible 608. The generated markup is then added to the content store 609 and the modal is populated 610.

Figure 7:
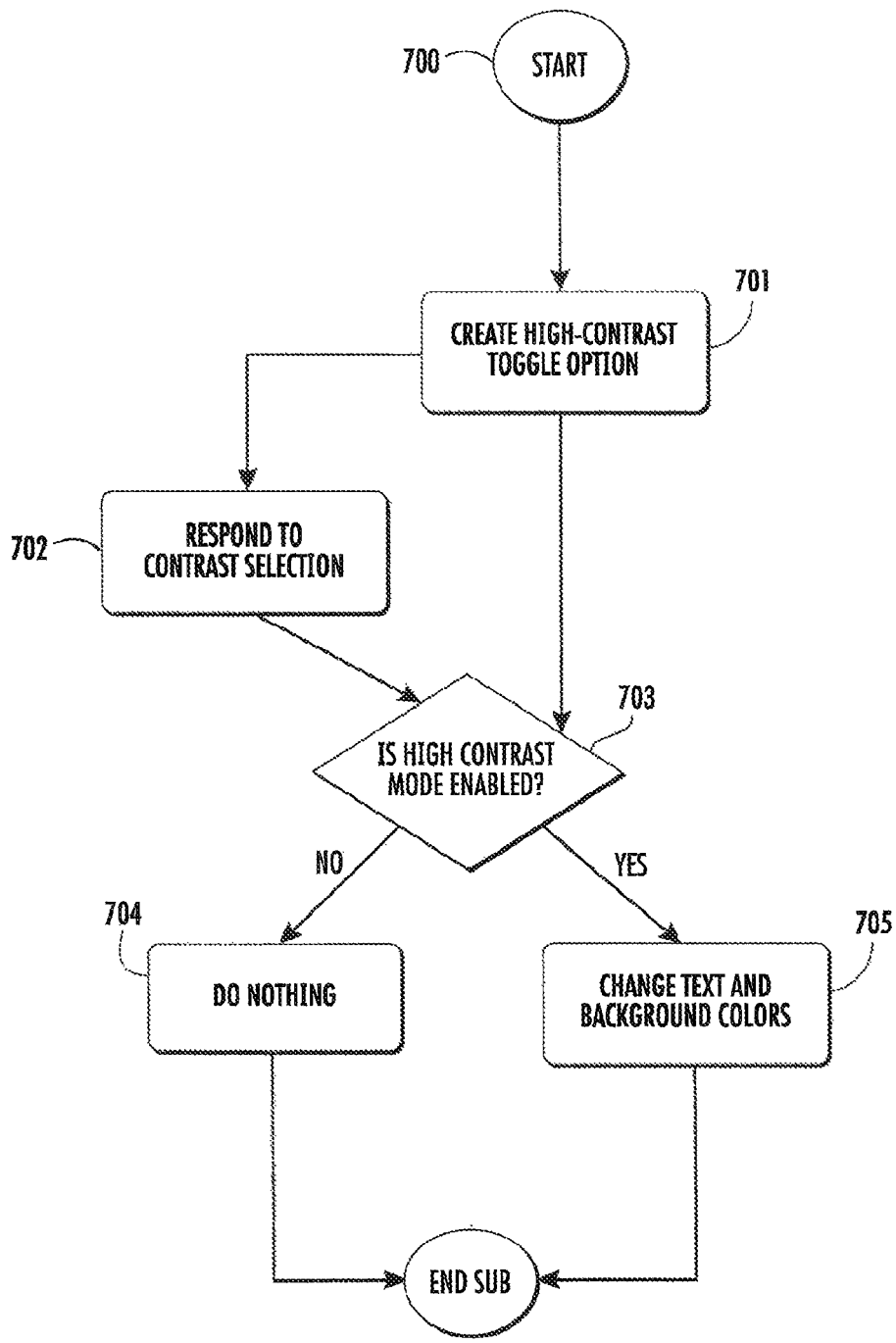
FIG. 7 is a flow chart pertaining to contrast adjustment.

FIG. 7 shows a high-contrast sub-process 7. A high-contrast mode option 701 is created that responds to being toggled on or off 702. The AVT Method 1000 determines if high-contrast mode is enabled 703. If it is not, there is no noticeable ui change 704. If it is, the text and background colors throughout the AVT Method 1000 and the aforementioned navigational components and content display adapt accordingly to a WCAG-compliant high-contrast ratio and color scheme, thereby changing the text and background colors 705.

Figure 8:
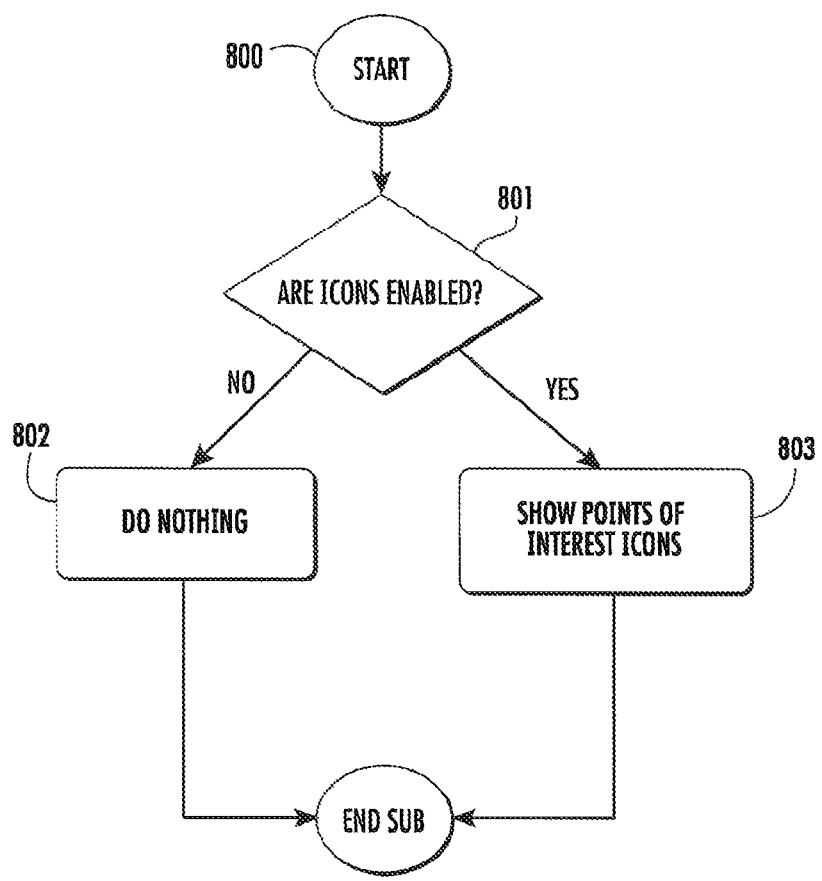
FIG. 8 is a flow chart of a sub-process method to allow an icon for points of interest.

FIG. 8 shows an icon sub-process. The AVT Method 1000 checks to see if the icon display setting is enabled 801. If it is not, there is no change to the ui 802. If it is enabled, the AVT Method displays the graphic representations (icons) of the points of interest from the native version of the tour 803, 1507.

Figure 9:
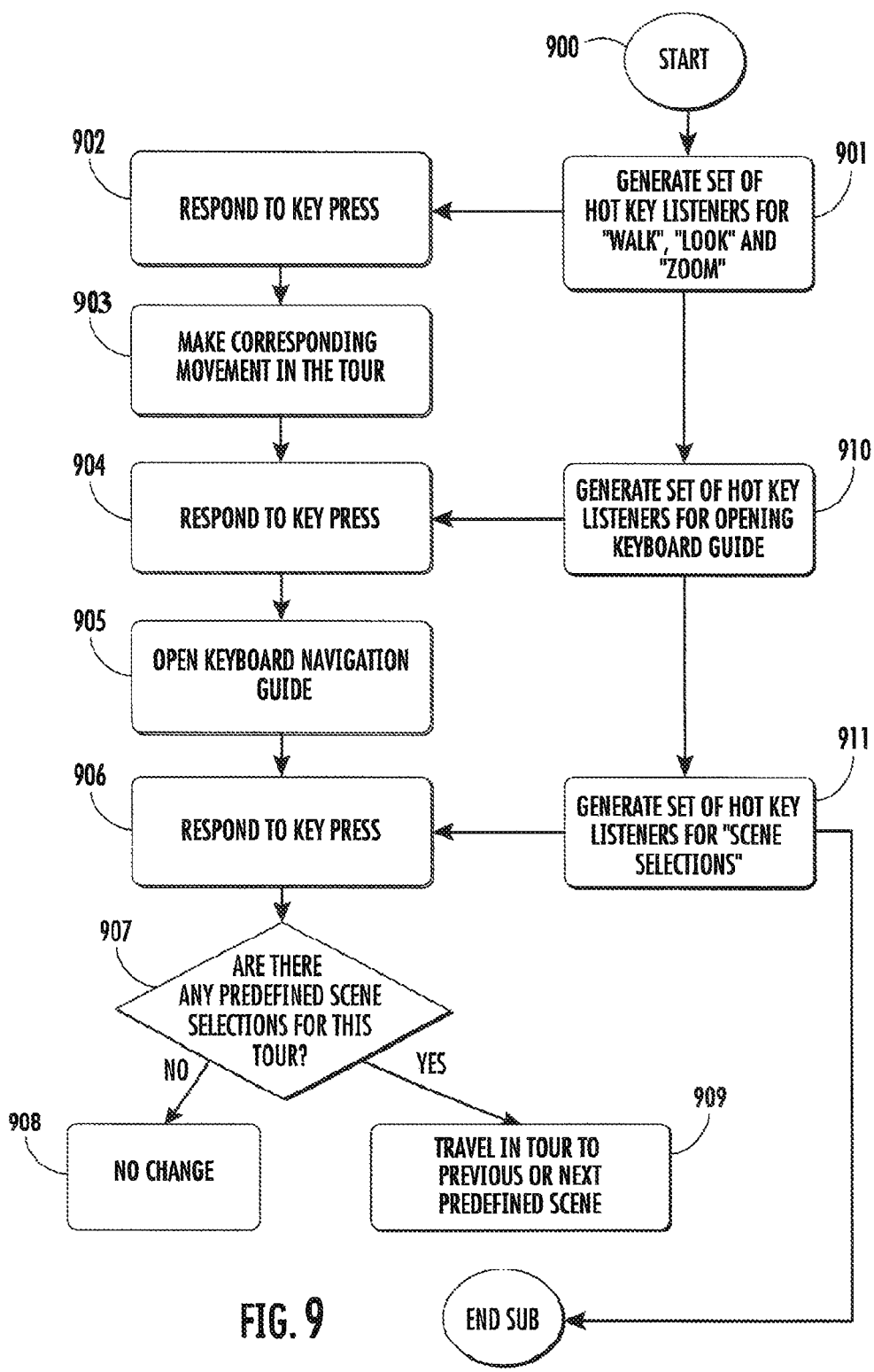
FIG. 9 is a flow chart of a sub-process method for responding to input via a key-press.
Figure 16:
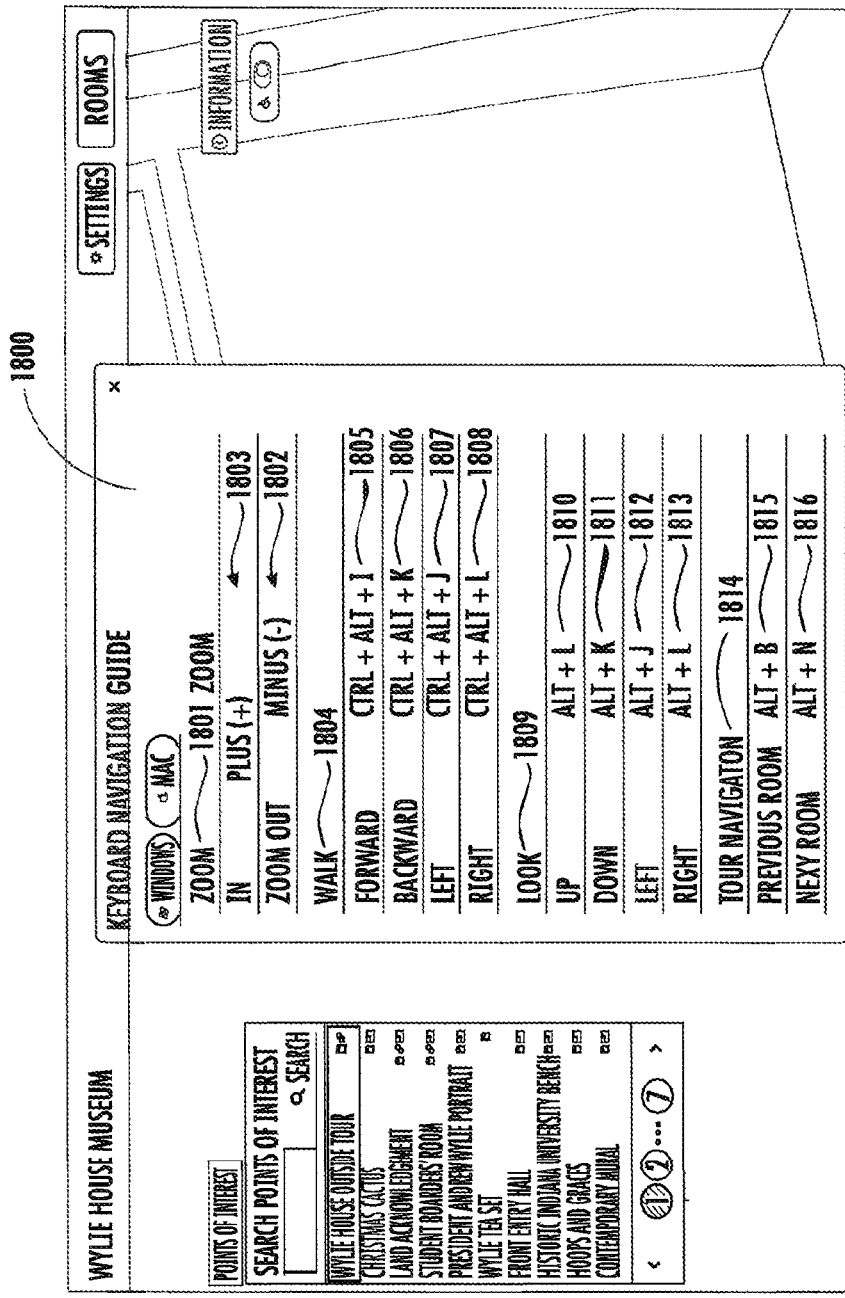
FIG. 16 is a further screenshot of an Accessible Virtual Tour, with the keyboard navigation controls displayed.

FIG. 9 shows a key press sub-process. The sub-process is started 900. FIG. 16 shows a rendering of a virtual tour with the keyboard control menu 1800 opened. The AVT Method 1000 generates a set of custom hot keys 901 that respond to particular key presses 902, 1800. In response to the key presses, the AVT Method adjusts the camera position in displayed scenes 903, enabling the user to travel through the tour in a digitally accessible manner. The AVT Method 1000 generates a set of custom hot key listeners for opening keyboard guide 910 that respond to particular key presses 904, 1801-1816. This causes the AVT Method 1000 to open a keyboard navigation guide 905, 1800. The AVT Method 1000 also generates a set of hot key listeners for scene selection 911. The AVT Method 1000 will respond to the key presses 906, 1801-1816. If there are no predefined scene selections for this tour 907-NO, there is no change 908 to the ui. If predefined scenes have been loaded, the AVT Method 1000 adjusts the camera position in the tour 909 taking the user to either the previous or next predefined scene 909.

We claim:

1. A method for enabling keyboard control of a virtual tour comprising the steps of
using an end-user electronic device with keyboard capability;
selecting a virtual tour
running an initialization sub-process in order to enable WCAG-compliant keyboard control of the virtual tour comprised of
establishing an initial state;
detecting user-provided tour initialization information;
determining tour provider;
determining whether an accessibility mode is enabled;
performing the following steps in response to the accessibility mode not being enabled
embedding the native virtual tour in an iFrame;
creating a toggle to engage accessibility mode;
rendering the toggle on the virtual tour as an overlay; and
responding to user enabling accessibility mode; and
performing the following steps in response to the accessibility mode being enabled
embedding the native virtual tour in an iFrame;
disabling the functionality of the native virtual involving navigation, points of interest, labels, and hotspots:
creating a toggle to engage accessibility mode;
rendering the toggle on the virtual tour as an overlay:
initializing a loading sequence;
fetching data from the virtual tour provider;
storing data from the virtual tour provider in local state;
determining if there are pre-defined scene selections;
loading points of interest;
enabling high contrast;
displaying icons; and
navigating the virtual tour by altering a media presentation
representing a physical space, in a manner to mimick moving through the physical space, in response to user input made through the WCAG-compliant keyboard of the end-user electronic device.

2. The method of claim 1 wherein the method performs the following additional steps in response to determining that there are pre-defined scenes creating digitally accessible scene menu; creating digitally accessible button that opens and closes the scene menu; populating the menu with scene selections; sensing if the user selects a scene; responding to a scene selection by loading the appropriate portion of the virtual tour, corresponding with the selected scene; and determining if there is a point of interest ("POI") with the name of the selected menu item.

3. The method of claim 2, wherein the method performs the following additional steps in response to determining that there is a POI with the name of the selected menu item
Setting active the POI; and
Opening a digitally accessible modal with a close button.

4. The method of claim 3, where the method performs the following additional step in response to the close button of the modal being pressed Closing modal.

5. The method of claim 4, wherein the method loads points of interest by performing the following steps;
retrieving available POIs for the virtual tour;
creating a digitally accessible menu, wherein the POIs are sorted; and
creating a digitally accessible button to open and close the POI menu.

6. The method of claim 5, wherein the user chooses to display all points of interest, which causes the method to perform the following additional steps populating a menu with all POIs.

7. The method of claim 6, wherein POI menu is populated with the following steps
Defaulting to page 1 of a pagination system;
Calculating the distance for each POI to the current position of the user;
Populating the menu with results set based on pagination selection and search ordered by proximity ascending; and
Activating first item by default.

8. The method of claim 7 comprising the further steps of
responding to a point-of-interest menu item selection by user;
presenting the user with the portion of the virtual tour corresponding to the point of interest selected;
opening a digitally accessible modal corresponding to the point of interest selected;
closing the prior menu;
creating a temporary content store;
identifying the title and description of the point of interest, and adding them to the temporary content store;
adding media associated with the POI to the content store; and
populating the modal with data from the temporary content store.

9. The method in claim 8, wherein adding media associated with the point of interest is accomplished by performing the following steps:
analyzing the media associated with the point of interest;
determining a media content provider and media content server upon which the media is hosted;
importing the media from the media content server; and
adding text, alt text, images, and video to the temporary content store.

10. The method of claim 9, wherein populating the modal is accomplished by performing the following steps:
generating appropriate markup to render links or media via same provider using native HTML elements that are inherently accessible;
rendering images as overlays on the modal;
rendering videos as overlays on the modal;

rendering text as an overlay on the modal, without placing the text on the images or videos; and rendering alt text as an overlay on the modal, without placing the alt text on the images, video, or text.

11. The method of claim 10, wherein when identifying media as an image it performs the following additional steps determining if there is a particular URL parameter related to the image in the SRC Value or image description;

extracting information; and using value as alternative tag value in the generated markup.

12. The method of claim 1, wherein the method enables high contrast by performing the following steps:

creating a high-contrast toggle option;

rendering the high-contrast toggle option; and responding to user contrast selection when the high-contrast toggle option is enabled by adjusting the contrast and color of the text and background colors.

13. The method of claim 1, wherein the method displays icons by performing the following steps:

determining if icons are enabled; and showing POI icons received from virtual tour.

14. The method of claim 1, wherein the method navigates the virtual tour using the keyboard of the end-user electronic device by performing the following steps:

generating a set of hot key listeners for "walk";

generating a set of hot key listeners for "look";

generating a set of hot key listeners for "scene selections";

responding to key press of the keyboard on the end-user electronic device by making a corresponding movement in the virtual tour which corresponds with key press; and presenting pre-defined scenes based off of key press input.

* * * * *